(12) United States Patent
Kuo et al.

(10) Patent No.: US 8,984,885 B2
(45) Date of Patent: Mar. 24, 2015

(54) THERMAL MAGNETIC ENGINE AND THERMAL MAGNETIC ENGINE SYSTEM

(75) Inventors: Chung-Jung Kuo, Taoyuan Hsien (TW);
Tze-Chern Mao, Taoyuan Hsien (TW);
Min-Tsz Lin, Taoyuan Hsien (TW);
Chieh-Cheng Liu, Taoyuan Hsien (TW);
Mao-Jen Hsu, Taoyuan Hsien (TW);
Ya-Yun Cheng, Taoyuan Hsien (TW);
Cheng-Yen Shih, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 189 days.

(21) Appl. No.: 13/615,772

(22) Filed: Sep. 14, 2012

(65) Prior Publication Data

US 2013/0263599 A1   Oct. 10, 2013

(30) Foreign Application Priority Data

Apr. 9, 2012   (TW) .............................. 101112486 A (51) Int. Cl.
*H02N 10/00* (2006.01)
*F03G 7/00* (2006.01)
*F03B 13/00* (2006.01)

(52) U.S. Cl.
CPC . *F03G 7/00* (2013.01); *H02N 10/00* (2013.01)
USPC .................. 60/721; 290/1 R; 290/43; 60/716; 310/306

(58) Field of Classification Search
CPC ..... H02N 10/00; H02N 11/00; H02N 11/006; H02N 11/008; H02K 53/00; F03G 7/00–7/10; F25B 2321/00; F25B 2321/002; F25B 2321/0021
USPC ............ 60/643, 645, 682, 715, 721; 310/306, 310/153, 154.01–154.49, 156.01–156.84, 310/307; 123/149 D; 290/1 R, 43
See application file for complete search history.

(56) References Cited

U.S. PATENT DOCUMENTS

| | | | |
|---|---|---|---|
| 396,121 A | 1/1889 | Tesla | |
| 476,983 A | 6/1892 | Edison | |
| 1,431,545 A * | 10/1922 | Schwartz | 310/306 |
| 2,391,313 A | 12/1945 | Hindle | |
| 3,743,866 A * | 7/1973 | Pirc | 310/306 |
| 3,795,103 A * | 3/1974 | Anderson | 60/651 |
| 4,447,736 A * | 5/1984 | Katayama | 290/1 R |

(Continued)

FOREIGN PATENT DOCUMENTS

| EP | 1843458 A1 * | 10/2007 | H02N 10/00 |
|---|---|---|---|
| JP | 54145908 A * | 11/1979 | H02N 11/00 |

(Continued)

*Primary Examiner* — Thomas Denion
*Assistant Examiner* — Laert Dounis
(74) *Attorney, Agent, or Firm* — CKC & Partners Co., Ltd.

(57) ABSTRACT

A thermal magnetic engine and a thermal magnetic engine system are disclosed. The thermal magnetic engine includes a fixed element, a rotation element, working fluid and a fin structure. The rotation element includes a working material. The rotation element rotates relative to the fixed element. The working fluid flows through the rotation element and forms a temperature difference on the working material. The fin structure is disposed on the rotation element. The rotation element rotates along a rotating direction due to the temperature difference on the working material and/or due to the flowing of the first working fluid through the fin structure.

16 Claims, 7 Drawing Sheets

(56) References Cited

U.S. PATENT DOCUMENTS

| | | |
|---|---|---|
| 4,730,137 A | 3/1988 | Vollers |
| 5,714,829 A | 2/1998 | Guruprasad |
| 6,739,137 B2 | 5/2004 | Minovitch |
| 8,278,774 B2 * | 10/2012 | Macchia .......................... 290/52 |
| 2006/0144048 A1 | 7/2006 | Schulz |
| 2011/0042957 A1 * | 2/2011 | Drews ............................ 290/54 |

FOREIGN PATENT DOCUMENTS

| | | | | |
|---|---|---|---|---|
| JP | 06141572 A | * | 5/1994 | ............. H02N 11/00 |
| JP | 2001289045 A | * | 10/2001 | ................ F01P 5/04 |
| JP | 2002281774 A | * | 9/2002 | ............. H02N 10/00 |

* cited by examiner

THERMAL MAGNETIC ENGINE AND THERMAL MAGNETIC ENGINE SYSTEM

RELATED APPLICATIONS

This application claims priority to Taiwan Application Serial Number 101112486, filed Apr. 9, 2012, which is herein incorporated by reference.

BACKGROUND

1. Technical Field

The present disclosure relates to a thermal magnetic engine and a system thereof. More particularly, the present disclosure relates to a thermal magnetic engine with a fin structure.

2. Description of Related Art

Since the oil crisis as well as the nuclear disaster happened from time to time, people start to find out sustainable and low-pollution alternative energy sources. Common alternative energy sources include biomass (bio-fuels), geothermal, solar cell, wind power, tides, ocean temperature difference power generation . . . , and so on. However, people still hope for finding out a renewable energy source.

Among them, utilizing a temperature difference (or temperature gradient) to generate electrical energy or mechanical energy is regarded as one of the widely discussed renewable energy implementation, which can be realized according to a temperature difference between two kinds of ocean water, between two working fluids or between a working fluid and an ambient temperature, so as to generate or convert the temperature difference into energy.

The operational theory of the thermal magnetic engine is based primarily on material characteristics of a working material. The permeability of the working material is varied as the ambient temperature changes. Especially, the permeability of the working material is varied dramatically in a certain temperature internal. This certain temperature internal or value is called the Curie temperature (Tc). The permeability of a first order material is varied even more significantly than the permeability of a second order material under the similar conditions around the Curie temperature. Furthermore, the thermal magnetic engine (also called the Curie engine) is a device based on the material characteristics of permeability changes around the Curie temperature, so as to convert the ambient heat into mechanical energy or other energy (e.g., electricity).

Magnetic heat engine applies an external magnetic filed on a working ring made of the working material. A heat source and/or a cold source are provided to form a temperature gradient (the range of the temperature gradient is better to cover the Curie temperature) on the working material under the magnetic field, so as to realize different permeability on the working material. Different permeability results in an uneven distribution of the magnetic field on the working ring, such that a magnetic torque is induced under the magnetic field to cause the rotation of the working ring. In this example, the working ring can be pivotally connected on a fixed frame. The kinetic energy within the rotation of the working ring can be exported via a specific transmission device. Accordingly, the temperature difference can be converted into a mechanical energy. Furthermore, the mechanical energy can be further converted into electricity by connecting the specific transmission device with a device like electronic comb.

In general, a heat/cold source of the thermal magnetic engine is usually a working fluid (such as ocean water, river water, spring water, tap water . . . , etc) bringing the hot/cold temperature onto a specific region (e.g., a rotatable portion including the working material) of thermal magnetic engine. The working fluid can be driven by a pump, gravity or some other ways to the thermal magnetic engine for thermal exchanging with the working material of the thermal magnetic engine. However, only temperature difference between working fluids is utilized, and the kinetic energy or potential energy of the working fluid flowing through the thermal magnetic engine is ignored in aforesaid examples. Therefore, overall efficiency of energy conversion is reduced on a traditional thermal magnetic engine.

SUMMARY

In order to solve the aforesaid problem, this disclosure provides a thermal magnetic engine and a system thereof. The thermal magnetic engine includes a fin structure on a rotation element. When a working fluid flows through the rotation element, not only the rotation element with a working material is driven to rotate by a magnetic force, but also the fin structure makes the rotation element rotate in the same rotating direction due to the kinetic energy and the potential energy of the working fluid flowing through rotation element. Therefore, the thermal magnetic engine may fully utilize all kinds of energy contained within the working fluid.

An aspect of the disclosure is to provide a thermal magnetic engine, which includes a fixed element, a rotation element, a first working fluid and a fin structure. The rotation element includes a working material. The rotation element rotates relative to the fixed element. The first working fluid flows through the rotation element, and forms a temperature difference on the working material. The fin structure is disposed on the rotation element. The rotation element rotates along a rotating direction due to the temperature difference on the working material and/or due to the flowing of the first working fluid through the fin structure.

According to an embodiment of this disclosure, the fixed element includes a magnetic unit. The magnetic unit is disposed on the fixed element and configured for establishing a magnetic field. The magnetic flux of the magnetic field passes through the working material of the rotation element. The working material makes the rotation element rotate along the rotating direction due to the temperature difference of the working material under the magnetic field.

According to an embodiment of this disclosure, the working material includes a first portion and a second portion. A first temperature of the first working fluid is different from a second temperature of the surrounding environment. The first working fluid flows through the first portion of the working material, so as to form the temperature difference between the first portion and the second portion of the working material.

According to an embodiment of this disclosure, the thermal magnetic engine further includes a second working fluid. The working material includes a first portion and a second portion. The first working fluid flows through the first portion of the working material, and the second working fluid flows through the second portion of the working material.

According to an embodiment of this disclosure, a first temperature of the first working fluid is different from a second temperature of the second working fluid, so as to form the temperature difference between the first portion and the second portion of the working material.

According to an embodiment of this disclosure, a permeability of the working material changes dramatically within a threshold temperature interval. The temperature difference is located crossover two opposite sides out of the threshold temperature interval.

According to an embodiment of this disclosure, the rotation element includes a rotation shaft. The fin structure includes a plurality of fins. The fins are extended from at least one side of the surface of the rotation shaft. The fins are disposed to be substantially ninety degrees from a direction of a flow path where the working fluid flows through the rotation element.

According to an embodiment of this disclosure, the rotation element includes a rotation frame and a rotation shaft. The rotation shaft is linked with the rotation frame and pivotally connected on the fixed element.

According to an embodiment of this disclosure, the fin structure includes a plurality of fins. The fins are extended from at least one side of the surface of the rotation frame. The fins are disposed to be substantially ninety degrees from a direction of a flow path where the working fluid flows through the rotation element.

According to an embodiment of this disclosure, the rotation frame includes an inner loop and an outer loop. The fin structure includes a plurality of fins. Each of the fins is connected between the inner loop and the outer loop. The fins are disposed at an angle substantially forty-five degrees from a direction of a flow path where the working fluid flows through the rotation element.

According to an embodiment of this disclosure, the rotation element includes a plurality of rotation frames and a rotation shaft. The rotation shaft substantially passes through central points of the rotation frames and sequentially connects with the rotation frames. The rotation shaft is pivotally connected on the fixed element. The fin structure is disposed on the rotation frames. The first working fluid flows through the fin structure.

According to an embodiment of this disclosure, the fin structure includes a plurality of fins. The fins are disposed on the rotation frames respectively.

According to an embodiment of this disclosure, at least a portion of the rotation frames are made of the working materials. The working materials have different threshold temperature intervals.

According to an embodiment of this disclosure, the thermal magnetic further includes a plurality of coils, a plurality of commutators and at least one electric brush. The fin structure includes a plurality of fins. Each of the fins is made of the working material. The coils are wound on the fins and electrically connected to the commutators. The electric brush is disposed on the fixed element.

Another aspect of the disclosure is to provide a thermal magnetic engine system, which includes a plurality of thermal magnetic engines and a first working fluid. The thermal magnetic engines are sequentially disposed on a flow path. Each of the thermal magnetic engines includes a fixed element, a rotation element and a fin structure. The rotation element includes a working material. The rotation element rotates relative to the fixed element. The fin structure is disposed on the rotation element. The first working fluid flows within the flow path and sequentially flows through the rotation elements of the thermal magnetic engines, and the first working fluid forms temperature differences on each of the working materials. The rotation element rotates along a rotating direction due to temperature differences on the working materials and/or due to the flowing of the first working fluid through the fin structure.

According to an embodiment of this disclosure, the rotation element includes a plurality of rotation frames and a rotation shaft. The rotation shaft substantially passes through central points of the rotation frames and sequentially connects with the rotation frames. The rotation shaft is pivotally connected on the fixed element. The first working fluid flows through the rotation frames sequentially. The fin structure is disposed on the rotation frames.

According to an embodiment of this disclosure, at least a portion of the rotation frame is made of the working material.

According to an embodiment of this disclosure, at least a portion of the rotation frame is disposed within the flow path, such that the first working fluid flows through the portion of the rotation frame.

According to an embodiment of this disclosure, the thermal magnetic engine system further includes a second working fluid flowing outside the flow path. The second working fluid flows through the other portion of the rotation frame when the first working fluid flows through the portion of the rotation frame.

According to an embodiment of this disclosure, wherein a temperature difference is existed between a temperature of the first working fluid and a temperature of the second working fluid.

BRIEF DESCRIPTION OF THE DRAWINGS

The disclosure can be more fully understood by reading the following detailed description of the embodiment, with reference made to the accompanying drawings as follows.

DETAILED DESCRIPTION

The thermal magnetic engine of this disclosure includes a fin structure disposed on a rotation element. The fin structure makes the rotation element rotate due to the kinetic energy or potential energy of the working fluid flowing through. Therefore, the thermal magnetic engine may fully utilize the temperature difference formed by the working fluid and also the kinetic energy or potential energy from the working fluid, so as to increase the overall energy-conversion efficiency of the thermal magnetic engine.

Figure 1:
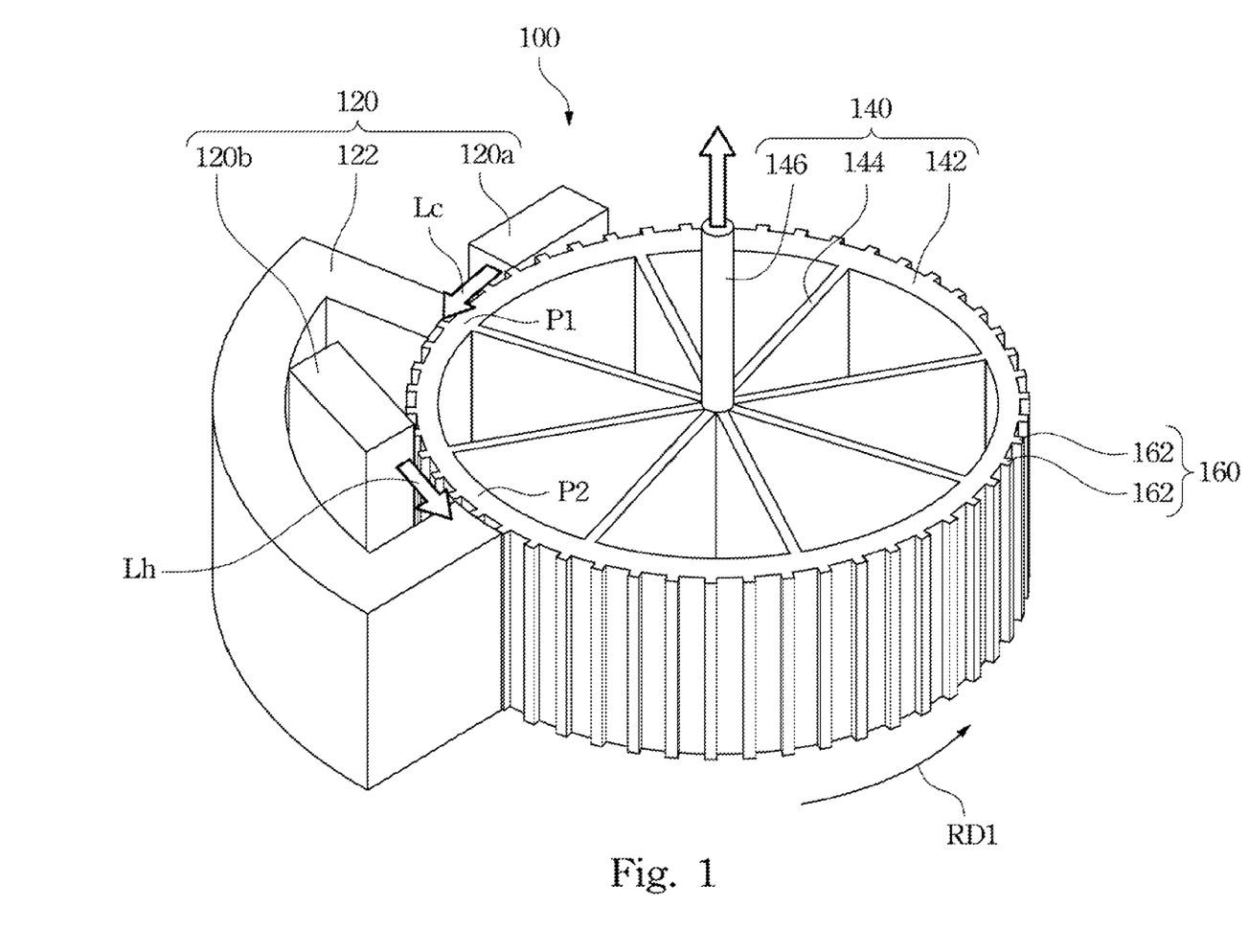
FIG. 1 is a side-view schematic diagram illustrating a thermal magnetic engine and main internal structures thereof according a first embodiment of this disclosure.

Reference is made to FIG. 1, which is a side-view schematic diagram illustrating a thermal magnetic engine 100 and main internal structures thereof according a first embodiment of this disclosure. As shown in figure, the thermal magnetic engine 100 includes a fixed element 120 (the fixed element 120 in the embodiment includes a feeding terminal 120a of a low-temperature working fluid Lc, a feeding terminal 120b of a high-temperature working fluid Lh and a fixed magnetic yoke 122), a rotation element 140 (the rotation element 140 in the embodiment includes a rotation frame 142, a connection portion 144 and a rotation shaft 146) capable of rotating relative to the fixed element, and a fin structure 160 disposed on the rotation element 140 (the fin structure 160 in this embodiment is disposed on an outer surface of the rotation frame 142). The rotation shaft 146 serves as a pivotal center when the rotation element 140 rotates relative to the fixed element 120.

In this embodiment, the rotation element 140 includes a working material. For example, the rotation frame 142 can be made of the working material, but the invention is not limited thereto. In other embodiments, at least a portion of the rotation frame 142 can be made of the working material (e.g., a ring-shaped area with a certain thickness along an outer edge of the rotation frame 142 can be made of the working material, or arc portion on the rotation frame 142 with different phase angles can be made of the working material and other general materials alternatively).

In the disclosure, the fixed element 120 includes a magnetic unit. In this embodiment, the magnetic unit can be buried within the fixed magnetic yoke 122. The magnetic unit can be a temporary electromagnet or a permanent magnet. In this embodiment, the magnetic unit is disposed in the fixed component (the fixed magnetic yoke 122) for establishing a magnetic field. Magnetic fluxes of the magnetic field go across the working material of the rotation frame 142.

In this embodiment, the rotation frame 142 is made of the working material. The feeding terminal 120a and the feeding terminal 120b are disposed at different angles around the rotation frame 142. The feeding terminal 120a guides the low-temperature working fluid Lc with a first temperature through a portion of the rotation frame 142. The feeding terminal 120b guides the high-temperature working fluid Lh with a second temperature through another portion of the rotation frame 142. The low-temperature working fluid Lc and the high-temperature working fluid Lh have different temperatures (the first temperature is lower than the second temperature in this embodiment). In this case, a temperature difference is formed on the working material of the rotation frame 142. As shown in FIG. 1, the working material at the first portion P1 corresponding to the feeding terminal 120a of the low-temperature working fluid Lc has a lower temperature, and the working material at the second portion P2 corresponding to the feeding terminal 120b of the high-temperature working fluid Lh has a higher temperature. Therefore, a temperature difference is formed on the working material between the first portion P1 and the second portion P2 on the rotation frame 142.

Because the working material has different permeability under different temperatures, the working material of the first portion P1 under the lower temperature may have a higher permeability, Under the magnetic field established by the fixed magnetic yoke 122, the magnetic fluxes going across the working material of the first portion P1 is relatively intensive; on the other hand, the working material of the second portion P2 under the higher temperature may have a lower permeability, such that the magnetic fluxes going across the working material of the second portion P2 is relatively scattered. Accordingly, a magnetic torque (a magnetic variance or bias) is induced on the rotation frame 142 for driving the rotation frame 142 to rotate along a rotating direction RD1 (i.e., in a direction from the low temperature portion to the high temperature portion).

In aforesaid embodiment, the thermal magnetic engine 100 includes two feeding terminals (120a, 120b) for high-temperature and low-temperature working liquids (Lc, Lh), and utilizes these two working fluids (Lc, Lh) to form the temperature difference on different portions on the rotation element 140. However, the invention is not limited thereto. In another embodiment, the thermal magnetic engine may further utilize more working liquids with different temperatures. For example, the working liquids can be arranged in a sequence of low, high, low and high temperatures, so as to realize more gaps between different temperatures. Or in another embodiment, the thermal magnetic engine may utilize only one working fluid (e.g., high-temperature water of industrial emissions, or melt water) with a temperature different from an ambient temperature, such that a temperature difference can be formed between the portion where the working fluid flowing through and another portion under the ambient temperature.

It is to be notice that, the permeability of the working material changes dramatically around a threshold temperature interval. Therefore, the first temperature and the second temperature of two working fluids (or one working fluid and the ambient temperature) can be configured to located at two opposite sides out of the threshold temperature interval (e.g., a Curie temperature $T_c$ interval). In this case, when the two different portions on the working material has the temperature difference between the first temperature and the second temperature, the variation of the permeability will be larger, such that the rotating force induced by the magnetic torque (a magnetic variance or bias) will be larger as well.

The fin structure 160 is disposed on the rotation element 140. In this embodiment, the fin structure 160 is disposed on an outer surface of the rotation frame 142. The fin structure 160 includes several fins 162 arranged wave-like on the outer surface of the rotation frame 142. As shown in FIG. 1, the fins 162 are extended outward from the outer surface of the rotation frame 142. A specific angle can be formed between the extending direction of the fins 162 and the flowing direction of the low-temperature working fluid Lc and the high-temperature working fluid Lh through the rotation element 140. In this embodiment, the fins 162 are disposed to be substantially ninety degrees from the direction of the flow path where the working fluid flows through the rotation element 140. In another embodiment, the specific angle can be forty-five degrees as well.

For achieving a better heat exchange efficiency, the low-temperature working fluid Lc and the high-temperature working fluid Lh in practical applications are usually pressed by a pump through the surface of the rotation frame 142 at a high speed. Therefore, when the low-temperature working fluid Lc and the high-temperature working fluid Lh flow through the surface of the rotation frame 142 (even impacting the surface at a high velocity), the fluids may push the fins 162 (i.e., the fin structure) on the rotation frame 142. The fin structure 160 under the impact of the fluids may change its kinetic or potential energy level, so as to make the rotation frame 142 and the whole rotation element 140 rotate. The rotating direction due to the kinetic energy or potential energy can be designed to be in the same direction RD1 induced by the magnetic force, so as to enhance the rotating effect brought by the working fluids (driving the rotation frame 142 by the magnetic torque as well as the kinetic energy or potential energy).

The rotation shaft 146 is linked with the rotation frame 142 via the connection portion 144. In practical applications, the rotation shaft 146 pivotally connected on a pivotal joint hole (not shown) or a pivotal stand (not shown) of the fixed element 120. While the rotation element 140 is rotating, the rotation shaft 146 may transfer the mechanical energy from the rotation element 140 to some other mechanical structures for further utilization, or to a power generator for generating electricity. In other words, the thermal magnetic engine 100 with the fin structure 160 of this disclosure may utilize both of the temperature difference and the kinetic energy from the working fluid(s). Furthermore, the fin structure 160 may also increase the total contact area between the rotation frame 142 and the working fluid(s), such that the fin structure 160 helps to accelerate the rate of heat exchanging.

Figure 2:
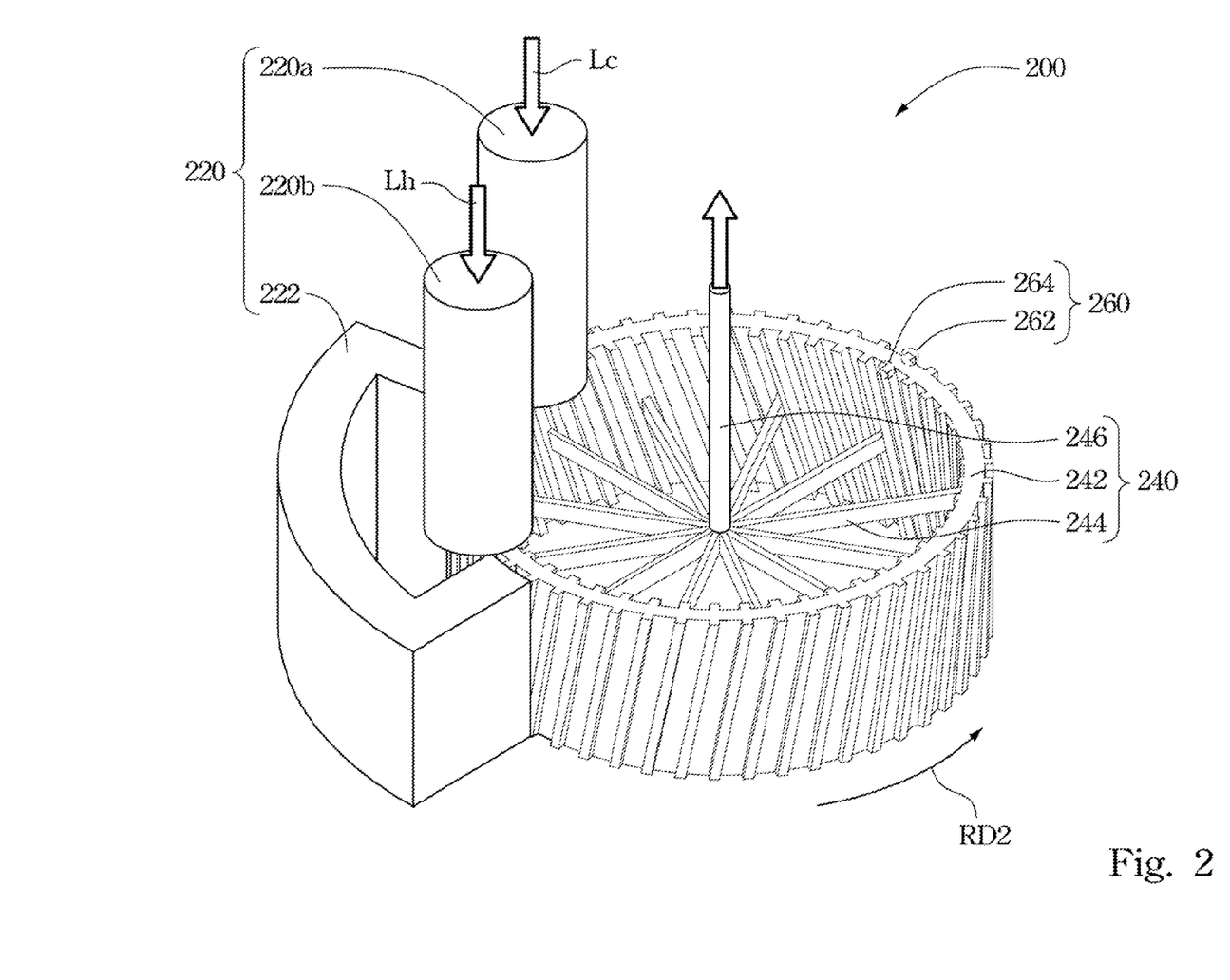
FIG. 2 is a side-view schematic diagram illustrating a thermal magnetic engine and main internal structures thereof according a second embodiment of this disclosure.

However, the location, implementation or direction relative to the working fluids of the fin structure 160 is not limited to the thermal magnetic engine 100 in the first embodiment of this disclosure. Reference is made to FIG. 2, which is a side-view schematic diagram illustrating a thermal magnetic engine 200 and main internal structures thereof according a second embodiment of this disclosure. As shown in figure, the thermal magnetic engine 200 includes a fixed element 220 (the fixed element 220 in the embodiment includes a feeding terminal 220a of a low-temperature working fluid Lc, a feeding terminal 220b of a high-temperature working fluid Lh and a fixed magnetic yoke 222), a rotation element 240 (the rotation element 240 in the embodiment includes a rotation frame 242, a connection portion 244 and a rotation shaft 246) capable of rotating relative to the fixed element 220, and a fin structure 260. The rotation shaft 246 serves as a pivotal center when the rotation element 240 rotates relative to the fixed element 220.

In this embodiment, the rotation frame 242 of the rotation element 240 is made of the working material. The magnetic yoke 222 of the thermal magnetic engine 200 includes a magnetic unit (e.g., a temporary electromagnet or a permanent magnet). In this embodiment, the magnetic unit is configured for establishing a magnetic field. Magnetic fluxes of the magnetic field go across the working material of the rotation frame 242.

The feeding terminal 220a and the feed terminal 220b respectively guides the low-temperature working fluid Lc and the high-temperature working fluid Lh for flowing through (or impacting at high-speed onto) the rotation frame 242, so as to form a temperature difference. The working material within the rotation frame 242 induces a magnetic variation corresponding to different temperatures due to the material characteristic, such that a magnetic torque (a magnetic variance or bias) is induced on the rotation frame 242 for driving the rotation frame 242 to rotate along a rotating direction RD2 (i.e., in a direction from the low temperature portion to the high temperature portion). The rotation mechanism is similar to the first embodiment, can be referred to the first embodiment for further details and not be repeated here.

It is to be noticed that, the low-temperature working fluid Lc and the high-temperature working fluid Lh flow through the rotation frame 242 of the rotation element 240 in a vertical direction (from top to down). In the second embodiment, the fin structure 260 includes several tilted fins 262 disposed on and extended outward from the outer surface of the rotation frame 242, and fin structure 260 also includes several tilted fins 264 disposed on and extended outward from the inner surface of the rotation frame 242. The outward extension is relative to each of the side surfaces where the fins 262 and 264 based on. Therefore, the extending directions of the fins 262 and 264 are different in this embodiment, but the invention is not limited thereto.

A specific angle can be formed between the extending direction of the tilted fins 262 and 264 and the flowing direction of the low-temperature working fluid Lc and the high-temperature working fluid Lh through the rotation element 240. In this embodiment, the specific angle can be 1~90 degrees. In other words, the fins 262 and 264 are not parallel to the flowing direction of the working fluids. For example, the tilted fins 262 can be disposed at a specific angle (e.g., forty-five degrees) from the flowing direction of the low-temperature working fluid Lc and the high-temperature working fluid Lh through the rotation element 240. As shown in FIG. 2, there is an angle from 10 to 15 degrees existed between the extending direction of the tilted fins 262 and 264 and the flowing direction. In this case, the kinetic energy and potential energy from the low-temperature working fluid Lc and the high-temperature working fluid Lh may continuously push the fin structure 260 on the rotation frame 242, so as to drive the rotation element to rotate in the same rotating direction RD2.

In other words, the rotation element 240 is driven to rotate not only by the magnetic torque induced from the temperature difference on the working material, but also by the kinetic energy or potential energy from the working liquids Lc and Lh flowing through and pushing the fin structure 260, so as to enhance the efficiency of energy conversion. Furthermore, the fin structure 260 may also increase the total contact area between the rotation frame 242 and the working fluids Lc and Lh, such that the fin structure 260 helps to accelerate the rate of heat exchanging.

Figure 3:
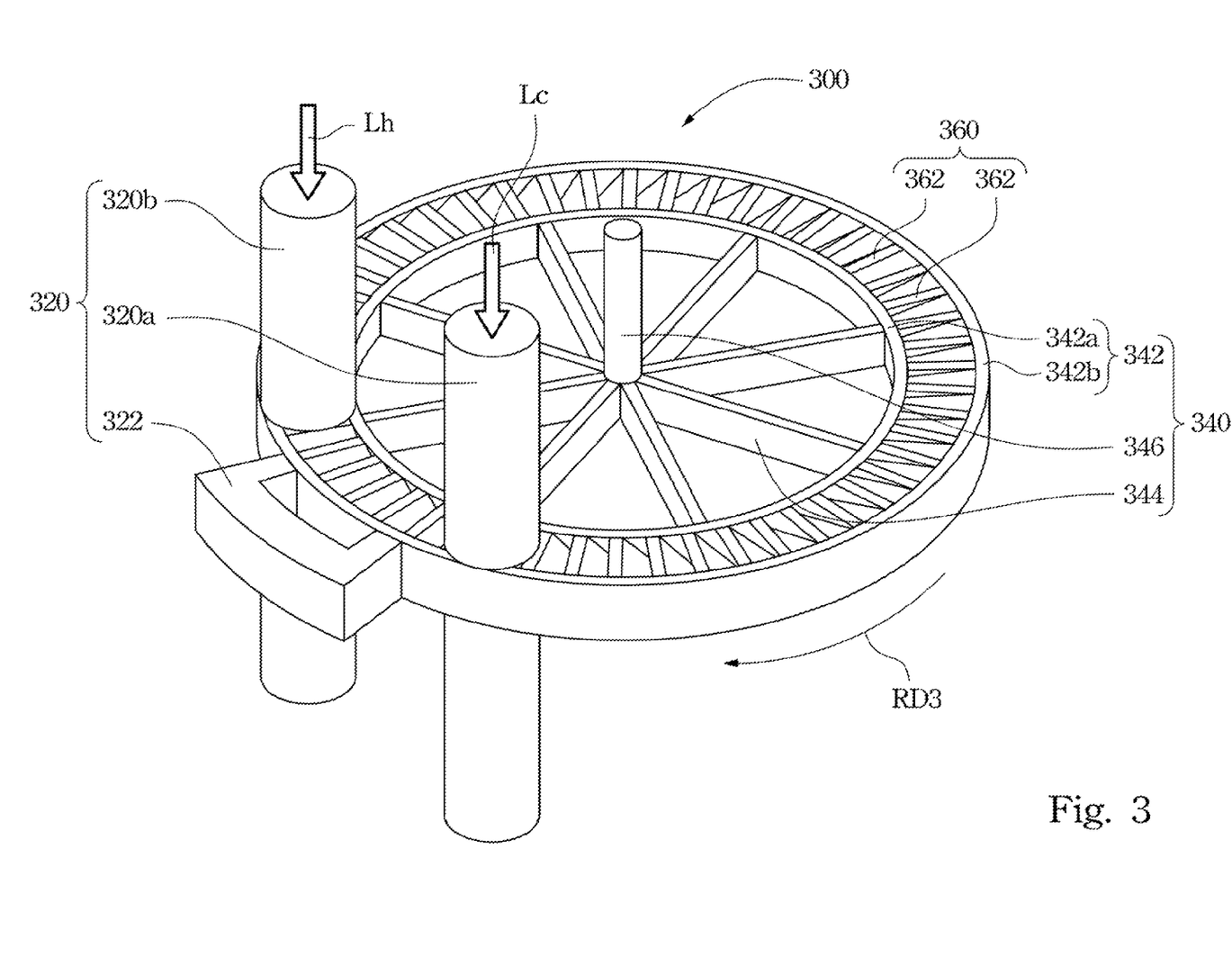
FIG. 3 is a side-view schematic diagram illustrating a thermal magnetic engine and main internal structures thereof according a third embodiment of this disclosure.
Figure 4:
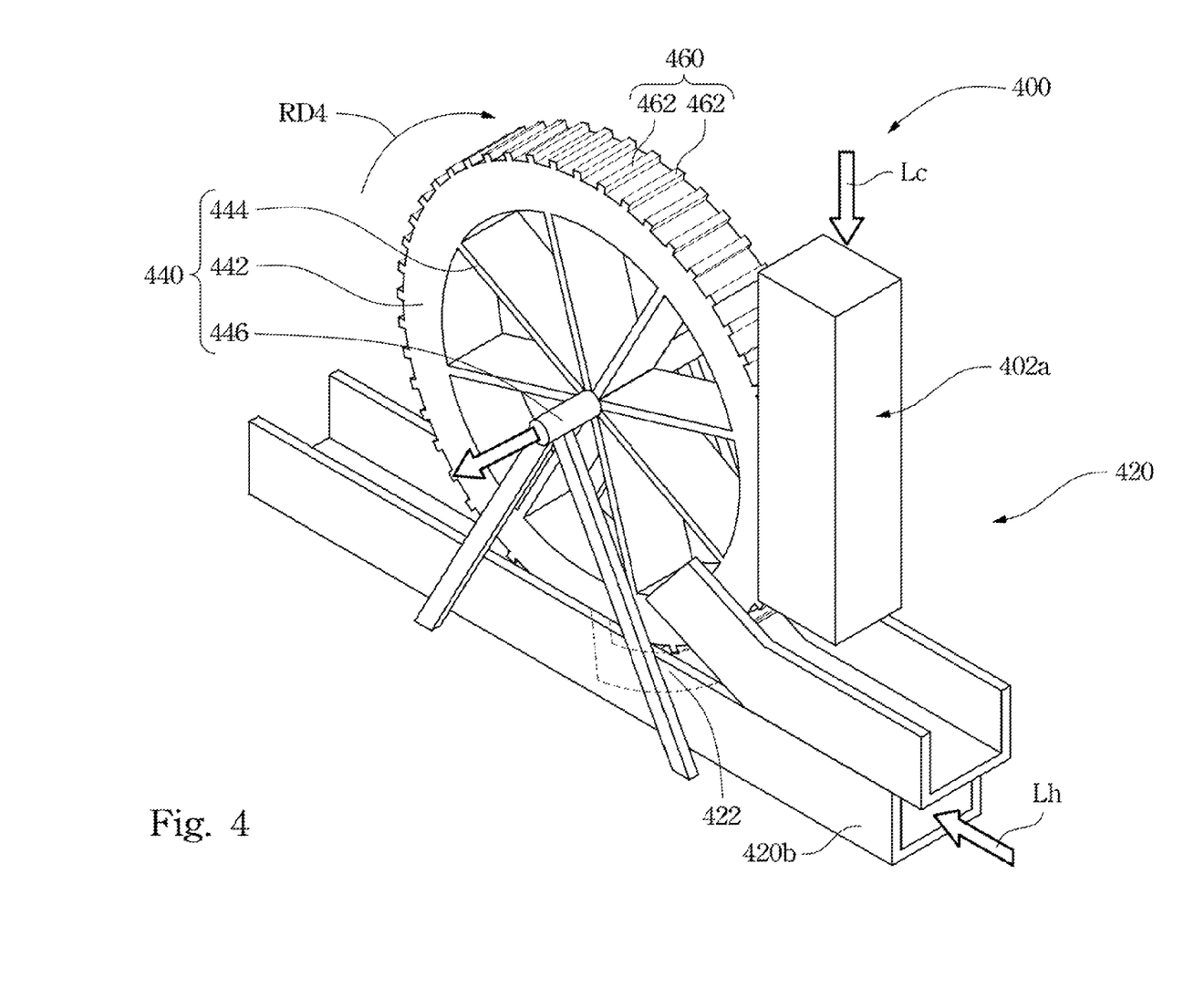
FIG. 4 is a side-view schematic diagram illustrating a thermal magnetic engine and main internal structures thereof according a fourth embodiment of this disclosure.

Furthermore, reference is made to FIG. 3 and FIG. 4 as well. FIG. 3 and FIG. 4 illustrate the location and implementation of a fin structure and a directional relationship between the fin structure and the flowing path of the cold/hot working fluid(s) according to different embodiments of this disclosure.

FIG. 3 is a side-view schematic diagram illustrating a thermal magnetic engine 300 and main internal structures thereof according a third embodiment of this disclosure. As shown in FIG. 3, the rotation frame 342 of the thermal magnetic engine 300 includes an inner loop 342a and an outer loop 342b. The fin structure 360 includes several fins 362. Each of the fins 362 is connected between the inner loop 342a and the outer loop 342b. The fins 362 are disposed at a specific angle from the direction of the flow paths where the low-temperature working fluid Lc and the high-temperature working fluid Lh flow through the rotation frame 342. For example, the specific angle can be forty-five degrees.

In this embodiment, at least a portion of the rotation frame 342 of the rotation element 340 is made of the working material. Furthermore, the fins 362 may also include the working material or be made of the working material.

In the third embodiment, the rotation element 340 is driven to rotate along the rotating direction RD3 not only by the magnetic torque induced from the temperature difference (formed by the low-temperature working fluid Lc and the high-temperature working fluid Lh) on the working material, but also by the kinetic energy or potential energy from the working liquids Lc and Lh flowing through and pushing the fin structure 360, so as to enhance the efficiency of energy conversion. The rotation mechanism and other details in the third embodiment are similar to aforesaid embodiments, can be referred to corresponding paragraphs in aforesaid embodiments for further details and not be repeated here.

FIG. 4 is a side-view schematic diagram illustrating a thermal magnetic engine 400 and main internal structures thereof according a fourth embodiment of this disclosure. As shown in FIG. 4, the feeding terminal 420a and the feeding terminal 420b guides the low-temperature working fluid Lc and the high-temperature working fluid Lh along a vertical direction and a horizontal direction respectively to different portions on the rotation frame 442.

In the fourth embodiment, the rotation element 440 is driven to rotate along the rotating direction RD4 not only by the magnetic torque induced from the temperature difference (formed by the low-temperature working fluid Lc and the high-temperature working fluid Lh) on the working material, but also by the kinetic energy or potential energy from the working liquids Lc and Lh flowing through and pushing the fin structure 460, so as to enhance the efficiency of energy conversion. The rotation mechanism and other details in the fourth embodiment are similar to aforesaid embodiments, can be referred to corresponding paragraphs in aforesaid embodiments for further details and not be repeated here.

As shown in FIG. 1 to FIG. 4, the rotation element can rotate vertically or horizontally. Furthermore, the rotation element may also rotate along a tilted axis. For example, the rotating axis of the rotation element located at 30 degrees away from a vertical line may achieve the similar features in aforesaid embodiments. In addition, the implementation of the working fluids can be arranged in a vertical flow path, horizontal flow path or any other equivalent flowing way capable of establishing the temperature difference on the magnetic material (working material).

Figure 5:
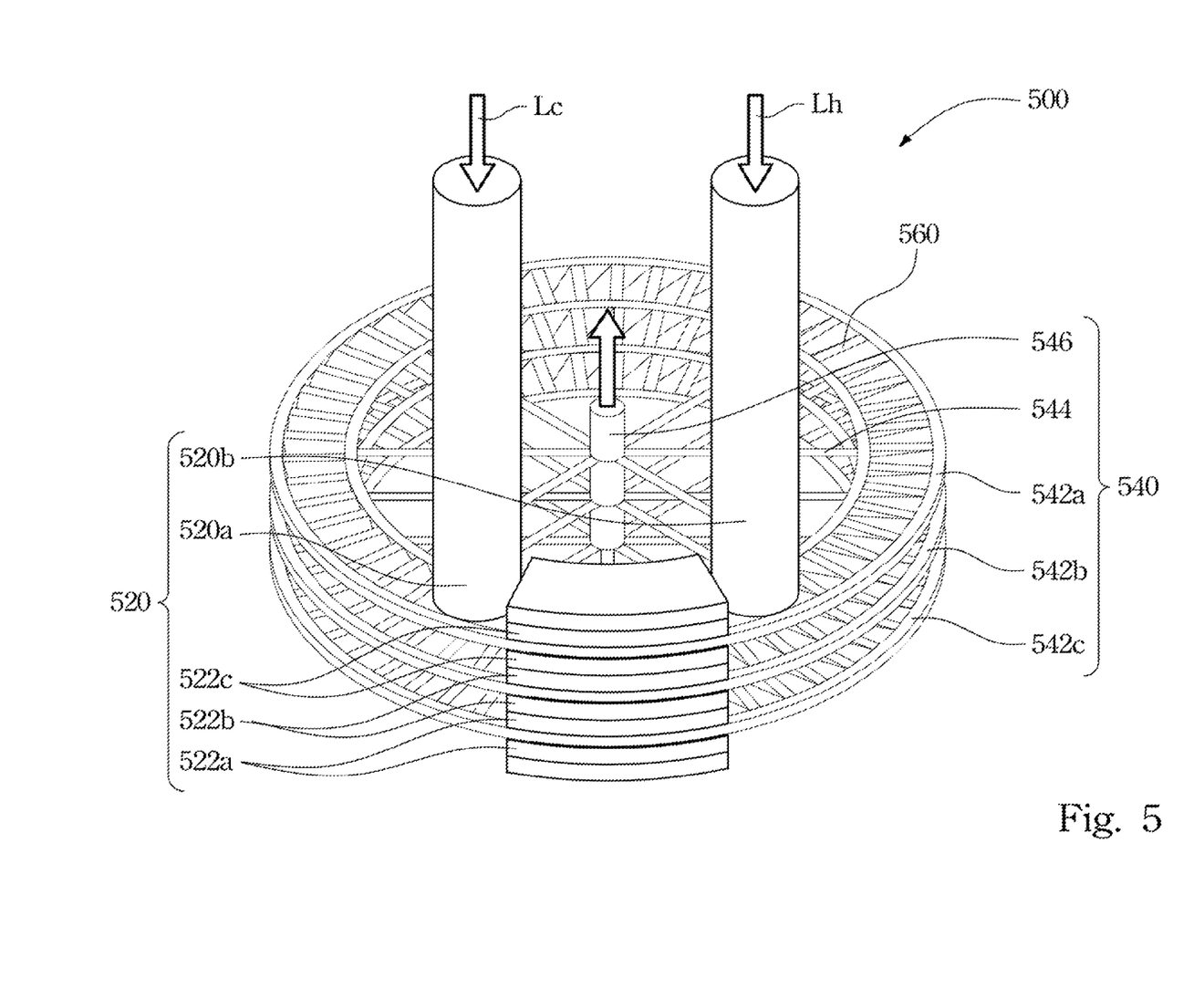
FIG. 5 is a side-view schematic diagram illustrating a thermal magnetic engine and main internal structures thereof according a fifth embodiment of this disclosure.

Reference is made to FIG. 5, which is a side-view schematic diagram illustrating a thermal magnetic engine 500 and main internal structures thereof according a fifth embodiment of this disclosure. As shown in figure, the thermal magnetic engine 500 includes a fixed element 520 (the fixed element 520 in the embodiment includes a feeding terminal 520a of a low-temperature working fluid Lc, a feeding terminal 520b of a high-temperature working fluid Lh, a fixed magnetic yoke 522a, a fixed magnetic yoke 522b and a fixed magnetic yoke 522c), a rotation element 540 and a fin structure 560.

It is to be noticed that, the rotation element 540 includes a rotation frame 542a, a rotation frame 542b, a rotation frame 542c, several connection portions 544 on each rotation frame (each rotation frame corresponds to three connection portions in this embodiment) and a rotation shaft 546. The rotation shaft substantially passes through central points of the rotation frames 542a, 542b and 542c, and rotation shaft 546 sequentially connects with the rotation frames 542a, 542b and 542c via the corresponding connection portions 544. The rotation shaft 546 pivotally connected on a pivotal joint hole (not shown) or a pivotal stand (not shown) of the fixed element 520. The low-temperature working fluid Lc and the high-temperature working fluid Lh flow through the rotation frames 542a, 542b and 542c sequentially. The fin structure 560 is disposed on each of the rotation frames 542a, 542b and 542c.

In this embodiment, at least one of portions of the rotation frames 542a, 542b and 542c of the rotation element 540 can be made of the working material. The magnetic yoke 522a, 522b and 522c of the thermal magnetic engine 500 include magnetic units (e.g., temporary electromagnets or permanent magnets). In this embodiment, the magnetic units are configured for establishing magnetic fields. Magnetic fluxes of the magnetic fields go across the working material of the rotation frames 542a, 542b and 542c.

The low-temperature working fluid Lc and the high-temperature working fluid Lh are guided to flow through (or impacting at high-speed onto) the rotation frames 542a, 542b and 542c in sequence, so as to form a temperature difference on the rotation element 540, which includes the rotation frames 542a, 542b, 542c, the connection portion 544 and the rotation shaft 546. The working material within the rotation element 540 induces a magnetic variation corresponding to different temperatures due to the material characteristic, so as to drive the rotation frames 542a, 542b, 542c to rotate, and further to drive the rotation element 540 to rotate. In addition, the kinetic energy or potential energy from the working liquids Lc and Lh pushes the fin structure 560, so as to increase the rotation force on the rotation element 540.

In addition, the temperature of the working liquids Lc and Lh may change while flowing through the working material on three rotation frames 542a, 542b and 542c. For example, the temperature of the working liquid Lh may decrease gradually. In this embodiment, at least one of portions of the rotation frames 542a, 542b and 542c are made of different working materials. Each working material with specific ingredients and a specific percentage may have one threshold temperature interval different from each other. A permeability of the working material changes dramatically within its own threshold temperature interval.

In this embodiment, the working material of the rotation frames 542a, 542b and 542c may have different threshold temperature interval from high to low temperatures by selecting the working material with different ingredients or percentage, so as to match the temperature variation on the working fluids between different rotation frames. On the other hand, when the temperature of the working fluids changes from low to high, the selection on the working material of the rotation frames 542a, 542b and 542c may adjust correspondingly.

In the fifth embodiment, the rotation element 540 is driven to rotate not only by the magnetic torque induced from the temperature difference (formed by the low-temperature working fluid Lc and the high-temperature working fluid Lh) on the working material, but also by the kinetic energy or potential energy from the working liquids Lc and Lh flowing through and pushing the fin structure 560, so as to enhance the efficiency of energy conversion. Furthermore, the multiple layers of rotation frames (three layers of rotation frames 542a, 542b and 542c in this embodiment, but the invention is not limited thereto) are implemented in the embodiment to utilize the temperature difference and the kinetic energy or potential energy from working fluids Lc and Lh with a better efficiency.

Figure 6:
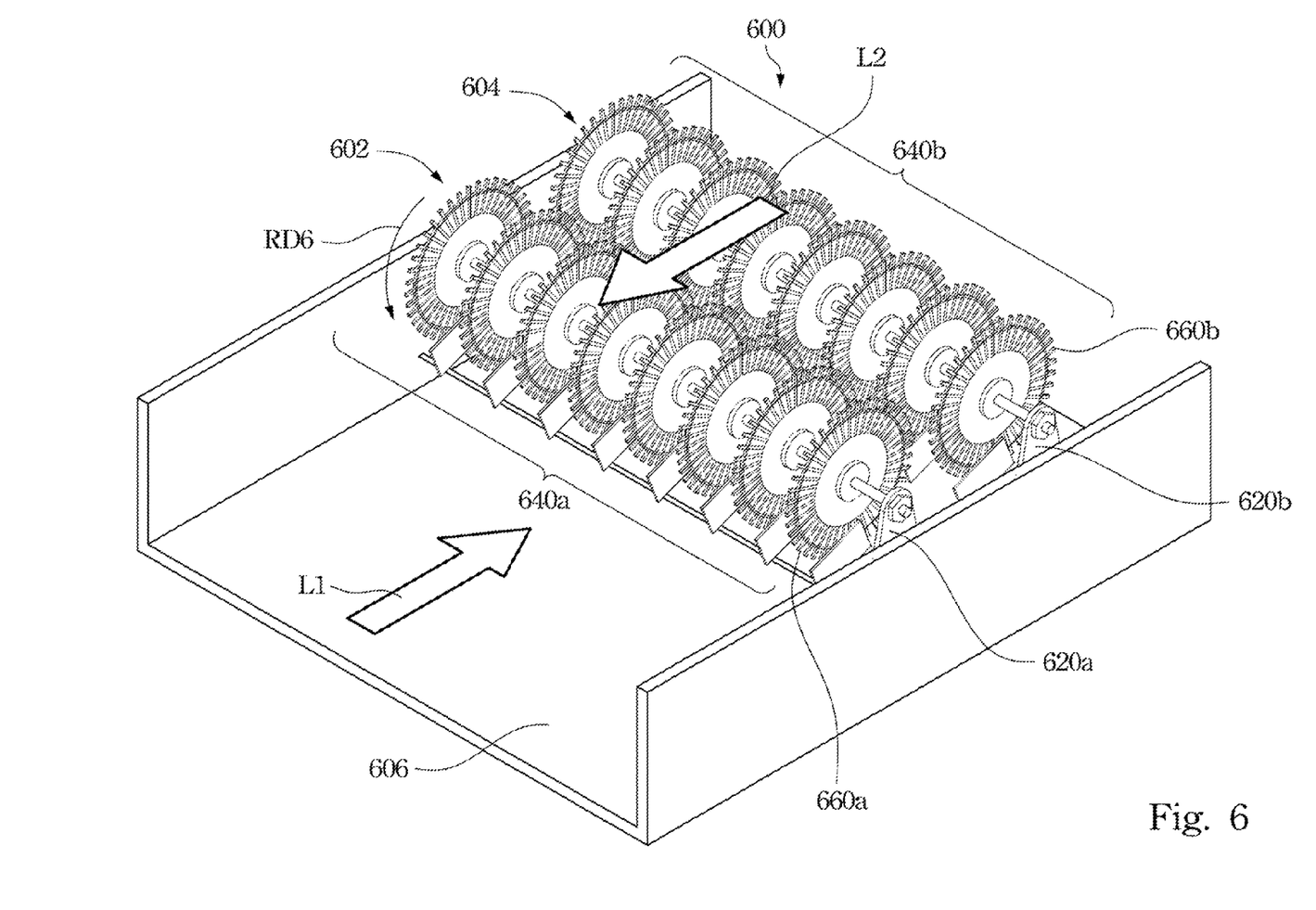
FIG. 6 is a schematic diagram illustrating a thermal magnetic engine system and main internal structures thereof according a sixth embodiment of this disclosure.

The fifth embodiment of this invention discloses a thermal magnetic engine with multiple rotation frames capable of repetitive utilizing a working fluid within the same flow path, or one or more working fluids within multiple flow paths, so as to achieve a better efficiency. Aforesaid one or more working fluids within multiple flow paths can be the same working fluid guiding from separated flow paths to the thermal magnetic engine, or different working fluids guiding from separated flow paths to the thermal magnetic engine. The arrangement can be adjusted according to practical requirements or applications. The arrangement can be replaced or substituted easily by a person in the art, shall not serves as a limitation of this invention. However, in applications of large-scale engines or power generators (e.g., power generating based on ocean temperature difference, hot spring temperature difference or any other similar power generation applications), several thermal magnetic engines located at different positions on the same flow path can be integrated to be a thermal magnetic engine system in order to output a large-scale energy for achieving a certain economic scale. Reference is made to FIG. 6, which is a schematic diagram illustrating a thermal magnetic engine system 600 and main internal structures thereof according a sixth embodiment of this disclosure.

As shown in FIG. 6, the thermal magnetic engine system 600 according to the sixth embodiment of the disclosure includes two thermal magnetic engines 602 and 604. The thermal magnetic engine 602 and the thermal magnetic engine 604 are disposed on a flow path 606 in sequence. Each of the thermal magnetic engines 604 and 606 includes its own fixed elements 620a and 620b, rotation elements 640a and 640b, and fin structures 660a and 660b. The rotation elements 640a and 640b includes the working material. The rotation elements 640a and 640b rotates relative to the fixed elements 620a and 620b. The fin structures 660a and 660b are disposed on the rotation elements 640a and 640b. Details of the thermal magnetic engine 602 and the thermal magnetic engine 604 are disclosed in aforesaid embodiments and not to be repeated here.

The working fluid L1 flows within the flow path 606. The working fluid L1 sequentially flows through the rotation elements 640a and 640b of the thermal magnetic engines 602 and 604, and forms a temperature difference on each of the working material, so as to make the rotation elements 640a and 640b rotate along the rotating direction RD6 due to the magnetic torque induced by the temperature difference on the working material. Furthermore, the fin structures 660a and 660b make the rotation elements 640a and 640b to rotate along the rotating direction RD6 according to the kinetic energy or potential energy from the working fluid L1 flowing through. In this embodiment, the working fluid L1 can be liquid or an equivalent fluid.

In addition, the working fluid L1 flows through the thermal magnetic engine 602 and the thermal magnetic engine 604 sequentially. The temperature of the working fluid L1 may change over time, e.g., gradually decreasing. In this embodiment, the working material within the thermal magnetic engine 602 and the thermal magnetic engine 604 can be designed to have different threshold temperature interval accordingly.

The threshold temperature interval of the thermal magnetic engine 602 and the threshold temperature interval of the thermal magnetic engine 604 can be adjusted according to the temperature of the working fluid L1 when the working fluid L1 passing by, so as to achieve maximal variation of the permeability of the working material on the thermal magnetic engines 602 and 604.

In addition, the rotation element 640a or 640b of each thermal magnetic engine (the thermal magnetic engine 602 or 604) in a large thermal magnetic engine system 600 may further include several rotation frames and a rotation shaft. The rotation shaft substantially passes through central points of the rotation frames and sequentially connects with the rotation frames. The rotation shaft is pivotally connected on the fixed element. The working fluid L1 flows through the rotation frames sequentially. The fin structures 660a and 660b are disposed on the rotation frames. The structure of multiple rotation frames is described in aforesaid fifth embodiment, and not to be repeated here.

Furthermore, the thermal magnetic engine system 600 in FIG. 6 only illustrates one working fluid L1, and the difference between the temperature of the working fluid L1 and an ambient temperature are utilized to form the temperature difference on the rotation element 540 on the thermal magnetic engine 602 or 604, but the invention is not limited thereto, in another embodiment, the thermal magnetic engine system 600 may include another working fluid (not shown in figure) other than the working fluid L1, and there is a temperature difference existed between the working fluid L1 and the other working fluid. The other working fluid can flow outside of the flow path 606. When the working fluid L1 flows through a portion of the rotation frame (the bottom portions from each of the rotation frames in this embodiment), the other working fluid flows through the other portion of the rotation frame (e.g., top or side surfaces from each of the rotation frames in this embodiment). In another embodiment as shown in FIG. 6, the other working fluid L2 can be gas or equivalent fluid flowing through the top surface of the rotation frames 640a or 640b, so as to drive a device for mechanical energy conversion (e.g., fin structures on the rotation element 640 on the thermal magnetic engine 602 or 604, or a windmill), such that the working fluid L2 may provide extra driving force to the thermal magnetic engine system 600. Aforesaid working fluids L1 and L2 can be aqueous liquid, oily liquid, sand, or gas.

In the aforesaid embodiment, the thermal magnetic engine mainly generates kinetic energy according to the variation of permeability on the working material under different temperatures. On the other hand, the working material within a magnetic field under different temperature conditions may have different intensity of magnetic fluxes. The variation of the intensity of magnetic fluxes can be used to generate electricity in an electromagnetic induction way.

Figure 7:
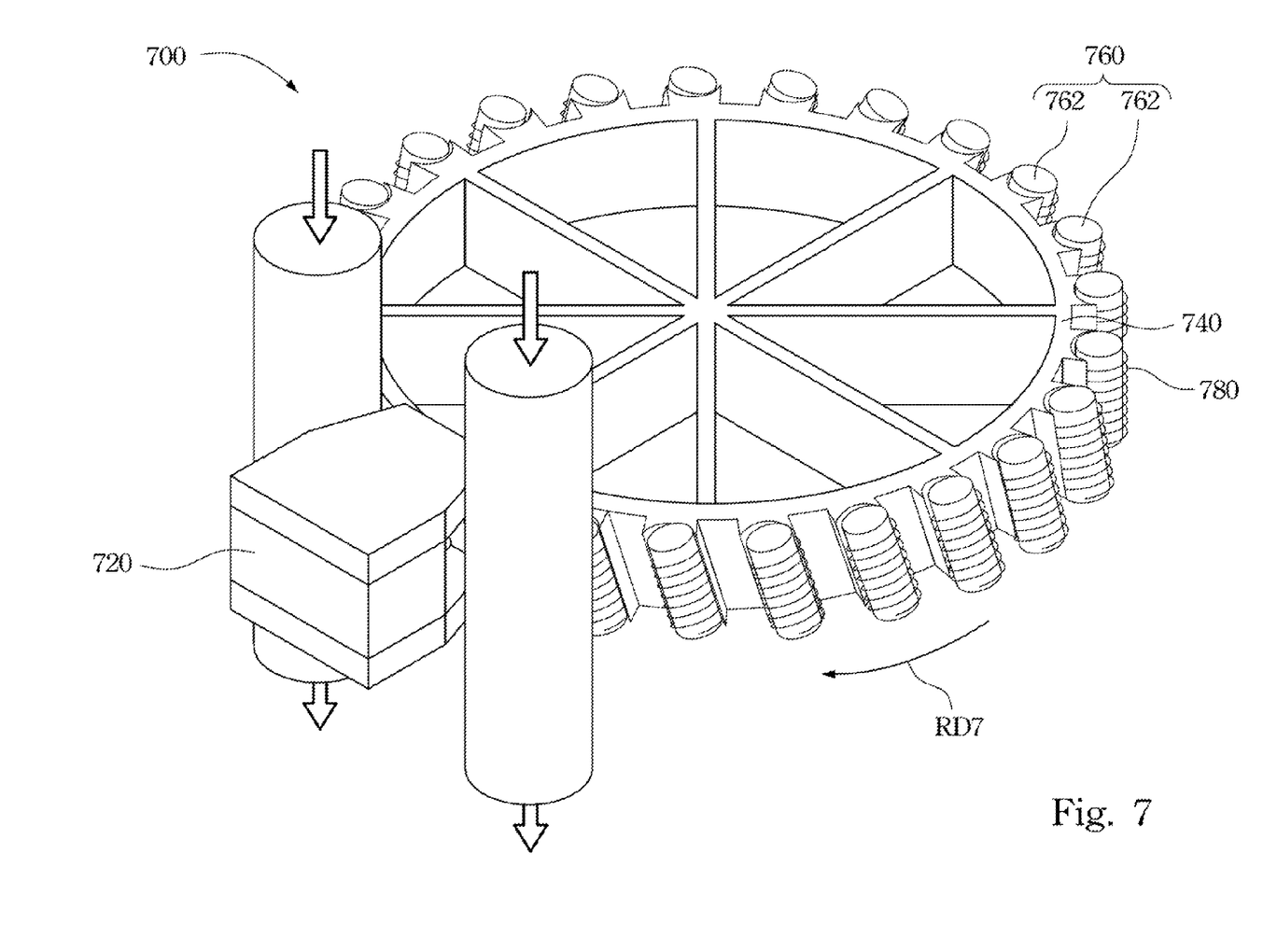
FIG. 7 is a schematic diagram illustrating a thermal magnetic engine and main internal structures thereof according a seventh embodiment of this disclosure.

FIG. 7 is a schematic diagram illustrating a thermal magnetic engine 700 and main internal structures thereof according a seventh embodiment of this disclosure. The thermal magnetic engine 700 includes a fixed element 720, a rotation element 740 capable of rotating, and a fin structure 760. The rotation element 740 includes a working material. The rotation element 740 is capable of rotating relative to the fixed element 720. The fin structure 760 is disposed on the rotation element 740.

To be noticed that, the fin structure 760 of the thermal magnetic engine 700 includes several fins 762 made of the working materials respectively. The thermal magnetic engine 700 further includes several coils 780, several commutators (not shown) and at least one electric brush (not shown). These coils 780 are respectively wound on the corresponding fins 762 and electrically connected to the corresponding commutators. The electric brush is disposed on the fixed element 720. The electric brush is configured to collect electric power from the coils 780. Therefore, the thermal magnetic engine 700 of the invention may utilize the heat, kinetic energy or potential energy carried by the working fluids, and also utilizes the variation of intensity of the magnetic fluxes on the working material. Other details of the thermal magnetic engine 700 are described in aforesaid embodiments, and not to be repeated here.

In summary, this disclosure provides a thermal magnetic engine and a system thereof. The thermal magnetic engine includes a fin structure on a rotation element. When a working fluid flows through the rotation element, not only the rotation element with a working material is driven to rotate by a magnetic force, but also the fin structure makes the rotation element rotate in the same rotating direction due to the kinetic energy and the potential energy of the working fluid flowing through rotation element. Therefore, the thermal magnetic engine may fully utilize all kinds of energy contained within the working fluid.

In aforesaid embodiments, the fin structure and fins thereof can be extended from the thicken side surface of the rotation shaft. In other words, the thicken rotation shaft may serves as a pivotal axis and also serves as the rotation frame and the connection portion in aforesaid embodiment. The fin structure and fins thereof can be extended from a side surface of this thicken rotation shaft, so as to achieve the purpose to simplify the structural design.

In the aforesaid embodiments, there is a specific angle between the fins and a direction of the low-temperature/high-temperature working fluid flowing through the rotation frame. For example, the specific angle can be roughly 90 degrees, 45 degrees, or other specific angle. In an embodiment of applying 90 degrees, the fins counter the most impacting force from the low-temperature/high-temperature working fluid, such that the fins may convert the kinetic energy and/or potential energy at a higher efficiency; in an embodiment of applying 45 degrees, the fins and the low-temperature/high-temperature working fluid have a large contact area and a longer contact time, and it remains a part of impacting force from the low-temperature/high-temperature working fluid.

In the aforesaid embodiments, the specific angle can be formed in several ways, such as using a fluid nozzle with universal joint for adjusting the flowing direction of the low-temperature/high-temperature working fluid easily; using a flow diversion method by providing multiple flow paths for a single fluid or more fluids flowing through the fins or fins structure; or, using an extra fan machine or other mechanical energy conversion device to provide extra driving force to the thermal magnetic engine of the present invention.

In addition, the fin structure of the invention may apply an anti-corrosion treatment, so as to ensure the fin structure may have longer durability and stability under the physical impacts or chemical effects from all kinds of working fluids. Anti-corrosion treatments on the fin structure includes covering the fin structure with an isolation layer, electrochemical corrosion, corrosion inhibitors, corrosion of metal or a combination thereof. In the invention, the low-temperature working fluid and the high-temperature working fluid can be aqueous liquid, oily liquid, sand, or gas, but the invention is not limited thereto.

In addition, the working material mentioned in this invention can be a magneto-caloric material, a temperature-sensitive magnetic-conducting material or a magnetic material having Curie transition Temperature ($T_c$). For example, the magneto-caloric material may include FeRh, $Gd_5Si_2Ge_2$, $Gd_5(Si_{1-x}Ge_x)_4$, $RCo_2$ (where R=rare-earth-element, such as but not limited to Nd, Ho, or Er), $La(Fe_{13-x}Si_x)$, $MnAs_{1-x}Sb_x$, MnFe(P, As), $Co(S_{1-x}Se_x)_2$, NiMnSn, MnCoGeB, $R_{1-x}M_xMnO_3$, (where R=lanthanide, M=Ca, Sr, and Ba) . . . , etc. The disclosure can not list all kinds of the working material in aforesaid embodiments. However, any working material, which has Curie transition Temperature ($T_c$) and has different magnetic characteristic (e.g., paramagnetic and diamagnetic) under two temperatures on the opposite sides of the Curie transition Temperature interval, can be utilized in this invention, but the invention is not limited thereto.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A thermal magnetic engine, comprising:
   a fixed element;
   a rotation element comprising a working material, the rotation element rotating relative to the fixed element;
   a first working fluid flowing through the rotation element, forming a temperature difference on the working material; and
   a fin structure disposed on the rotation element,
   wherein the rotation element rotates along a rotating direction due to the temperature difference on the working material and due to the flowing of the first working fluid through the fin structure,
   wherein the fixed element comprises a magnetic unit, the magnetic unit is disposed on the fixed element and configured for establishing a magnetic field, and magnetic flux of the magnetic field passes through the working material of the rotation element, the working material makes the rotation element rotate along the rotating direction due to the temperature difference of the working material under the magnetic field,
   wherein the rotation element comprises a rotation frame and a rotation shaft, the fin structure comprises a plurality of fins, the fins are extended from at least one side of the surface of the rotation frame, and the fins are disposed to be substantially ninety degrees from a direction of a flow path where the working fluid flows through the rotation element.

2. The thermal magnetic engine of claim 1, wherein the working material comprises a first portion and a second portion, a first temperature of the first working fluid is different from a second temperature of the surrounding environment, the first working fluid flows through the first portion of the working material, so as to form the temperature difference between the first portion and the second portion of the working material.

3. The thermal magnetic engine of claim 1, further comprising a second working fluid, wherein the working material comprises a first portion and a second portion, the first working fluid flows through the first portion of the working material, and the second working fluid flows through the second portion of the working material.

4. The thermal magnetic engine of claim 3, wherein a first temperature of the first working fluid is different from a second temperature of the second working fluid, so as to form the temperature difference between the first portion and the second portion of the working material.

5. The thermal magnetic engine of claim 1, wherein a permeability of the working material changes dramatically within a threshold temperature interval, the temperature difference is located crossover two opposite sides out of the threshold temperature interval.

6. The thermal magnetic engine of claim 1, wherein the rotation shaft is linked with the rotation frame and serves as a pivotal center when the rotation element rotates relative to the fixed element.

7. The thermal magnetic engine of claim 6, wherein the rotation frame comprises an inner loop and an outer loop, each of the fins is connected between the inner loop and the outer loop.

8. The thermal magnetic engine of claim 1, wherein the rotation element comprises a plurality of the rotation frames, the rotation shaft substantially passes through central points of the rotation frames and sequentially connects with the rotation frames, the rotation shaft serves as a pivotal center when the rotation element rotates relative to the fixed element, the fin structure is disposed on the rotation frames, and the first working fluid flows through the fin structure.

9. The thermal magnetic engine of claim 8, wherein the fins are disposed on the rotation frames respectively.

10. The thermal magnetic engine of claim 8, wherein each of the rotation frames in the plurality is made from a different working material, all with different threshold temperature intervals.

11. The thermal magnetic engine of claim 1, further comprising
   a plurality of thermal magnetic engines sequentially disposed on a flow path,
   the first working fluid flowing within the flow path and sequentially flowing through the rotation elements of the thermal magnetic engines and forming temperature differences on each of the working materials.

12. The thermal magnetic engine system of claim 11, wherein the rotation element comprises a plurality of the rotation frames, the rotation shaft substantially passes through central points of the rotation frames and sequentially connects with the rotation frames, the rotation shaft is pivotally connected on the fixed element, the first working fluid flows through the rotation frames sequentially, and the fin structure is disposed on the rotation frames.

13. The thermal magnetic engine system of claim 11, wherein at least a portion of the rotation frame is made of the working material.

14. The thermal magnetic engine system of claim 11, wherein at least a portion of the rotation frame is disposed within the flow path, such that the first working fluid flows through the portion of the rotation frame.

15. The thermal magnetic engine system of claim 14, further comprising a second working fluid flowing outside the flow path, wherein the second working fluid flows through another portion of the rotation frame when the first working fluid flows through the portion of the rotation frame.

16. The thermal magnetic engine system of claim 15, wherein a temperature difference is existed between a temperature of the first working fluid and a temperature of the second working fluid.

* * * * *